United States Patent [19]

Collin et al.

[11] Patent Number: 5,580,490

[45] Date of Patent: Dec. 3, 1996

[54] CRYSTALLITES OF CERIUM/LANTHANUM/TERBIUM PHOSPHATES FROM INSOLUBLE RARE EARTH SALTS

[75] Inventors: Marie-Pierre Collin, Epinay sur Seine; Denis Huguenin, Levallois; Anne-Marie le Govic, Paris, all of France

[73] Assignee: Rhone-Poulenc Chimie, Courbevoie Cedex, France

[21] Appl. No.: 302,978

[22] Filed: Sep. 12, 1994

Related U.S. Application Data

[63] Continuation of Ser. No. 141,093, Oct. 26, 1993, abandoned, which is a continuation of Ser. No. 914,594, Jul. 20, 1992, Pat. No. 5,314,641.

[30] Foreign Application Priority Data

Jul. 19, 1991 [FR] France .................................. 91 09142

[51] Int. Cl.⁶ .................................................. C09K 11/81
[52] U.S. Cl. .................................... 252/301.4 P; 423/263
[58] Field of Search ...................... 252/301.4 P; 423/263

[56] References Cited

U.S. PATENT DOCUMENTS

| | | | |
|---|---|---|---|
| 3,507,804 | 4/1970 | Ropp | 252/301.4 P |
| 3,634,282 | 1/1972 | Denis et al. | 252/301.4 P |
| 4,423,349 | 1/1983 | Nakajima et al. | 252/301.4 P |
| 5,091,110 | 2/1992 | Fan et al. | 252/301.4 P |
| 5,116,532 | 5/1992 | Chau et al. | 252/301.4 P |
| 5,132,042 | 7/1992 | Chau et al. | 252/301.4 P |
| 5,340,556 | 8/1994 | Collin et al. | 252/301.4 P |

FOREIGN PATENT DOCUMENTS

| | | |
|---|---|---|
| 0199200A3 | 10/1986 | European Pat. Off. . |
| 57-23674 | 2/1982 | Japan . |
| 59-179578 | 10/1984 | Japan . |
| 60-90287 | 5/1985 | Japan . |
| 62-218477 | 9/1987 | Japan . |
| 2124243 | 2/1984 | United Kingdom . |

OTHER PUBLICATIONS

World Patents Index Latest, Derwent Publication Ltd., London, GB; AN 84-291413 & JP-A-59 179 578 (Hitachi), Oct. 12, 1984.

World Patents Index Latest, Derwent Publication Ltd., London, GB; AN 82-80569E & JP-A-57 133 182 (Tokyo Shibaura), Aug. 17, 1982.

Primary Examiner—Melissa Bonner
Attorney, Agent, or Firm—Burns, Doane, Swecker & Mathis, L.L.P.

[57] ABSTRACT

Needle-shaped solid crystallites of specific LaCeTb phosphates, well suited for the production of green phosphors therefrom, are essentially pure white in color after calcination at 900° C. and have the formula (I):

$$La_xCe_yTb_{(1-x-y)}PO_4 \qquad (I)$$

in which x and y are numbers, with x ranging from 0.4 to 0.6 and x+y being greater than 0.8.

20 Claims, 2 Drawing Sheets

CRYSTALLITES OF CERIUM/LANTHANUM/TERBIUM PHOSPHATES FROM INSOLUBLE RARE EARTH SALTS

This application is a continuation of application Ser. No. 08/141,093, filed Oct. 26, 1993, now abandoned, which is a continuation of application Ser. No. 07/914,594, filed Jul. 20, 1992, now U.S. Pat. No. 5,314,641.

BACKGROUND OF THE INVENTION

1. Field of the Invention

The present invention relates to novel mixed rare earth phosphate crystallites well suited for the manufacture of phosphor, and, more especially, to the production of crystallites of certain cerium lanthanum lo terbium phosphates from water-insoluble rare earth salts, such phosphates being attractive green phosphor precursors.

2. Description of the Prior Art

As early as 1970 it was discovered that the mixed rare earth phosphates, and especially those of lanthanum, cerium and terbium, exhibited an advantageous luminescence property. Thus, numerous cerium lanthanum terbium phosphates, also designated the "LaCeTb phosphates," were developed, containing various concentrations of lanthanum, cerium and terbium.

The processes for their production were classified into two basic categories, namely, "dry route" processes and "wet route" processes.

The dry-route processes, described in particular in JP-62/007,785, WO-82/04,438, JP-62/089,790, JP-59/179,578 and JP-62/000,579, entail phosphating a mixture of rare earth oxides or phosphating a mixed rare earth oxide or a mixed rare earth oxalate via calcination in the presence of diammonium phosphate. The oxides can themselves be prepared by calcining a mixed rare earth oxalate (JP-62/218,477).

The "wet route" processes, described in particular in JP-57/023,674, JP-60/090,287 and JP-62/218,477, entail a direct synthesis of a mixed rare earth phosphate or of a mixture of rare earth phosphates by digestion of a solid compound (carbonate, oxide) with $H_3PO_4$ to precipitate the phosphates.

Thus, JP-57/023,674 describes the precipitation of rare earth phosphates by the action of phosphoric acid on rare earth carbonates in dilute medium. The product obtained is dried and then calcined at a temperature of 1,150° C. to provide a product luminescing in the green region of the spectrum. This process requires the use of a dilute reaction medium. As a result of this, it is not applicable on an industrial scale because large volumes of solution would have to be used to produce a small quantity of rare earth phosphate.

Furthermore, these processes entailing the direct precipitation of mixed rare earth phosphates result in the formation of gels or precipitates which filter very poorly.

SUMMARY OF THE INVENTION

Accordingly, a major object of the present invention is the provision of an improved process for the preparation of mixed rare earth phosphates and, more particularly, those of lanthanum, cerium and terbium, from media which are concentrated, especially in phosphate ions, and rare earths, and which improved process avoids or conspicuously ameliorates the above disadvantages and drawbacks to date characterizing the state of this art.

Another object of the present invention is the provision of novel mixed phosphates exhibiting a particular texture and particle size distribution, as well as a characteristic luminescence in a given color of the spectrum which is stable during aging.

Briefly, the present invention features the production of crystallites of cerium lanthanum terbium phosphates having the formula (I):

$$La_xCe_yTb_{(1-x-y)}PO_4 \quad (I)$$

in which x ranges from 0.4 and 0.6 and x+y is greater than 0.8.

DETAILED DESCRIPTION OF THE PREFERRED EMBODIMENTS OF THE INVENTION

Figure 1:
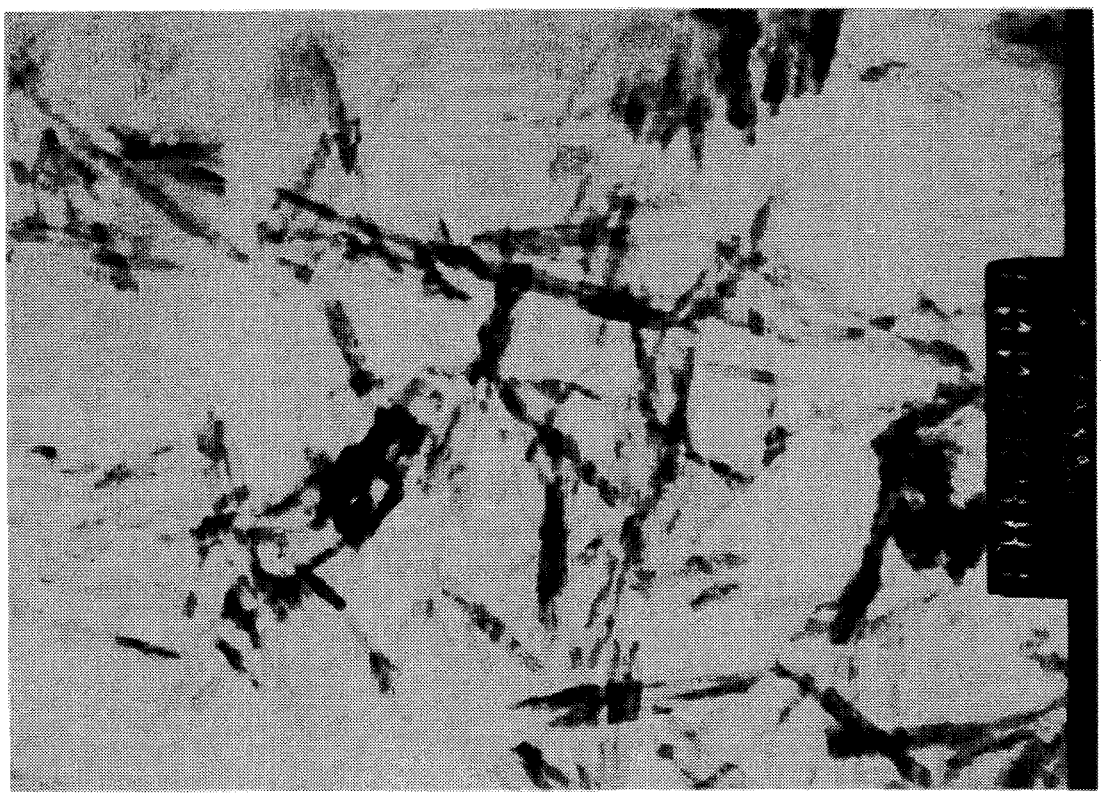
FIG. 1 is an electron photomicrograph of aggregates of the needle-shaped LaCeTb phosphate crystallites of the present invention.

More particularly according to the present invention, the subject mixed phosphates are needle-shaped crystallites.

After such phosphates have been subjected to a heat treatment at a temperature higher than at least 600° C. they exhibit a monoclinic crystalline phase.

The crystallites have a length ranging from 50 nm to 200 nm and a width ranging from 10 nm to 50 nm.

These crystallites have a hexagonal phase when they are dried at a temperature of approximately 50° C.

The mixed phosphates of the invention comprise particles which are aggregates of the needle-shaped crystallites. These aggregates have a mean diameter, measured using a Sedigraph 500® instrument, ranging from 1 μm to 15 μm, preferably from 2 μm to 10 μm.

According to this invention, the cerium lanthanum terbium phosphates, hereinafter designated simply the "LaCeTb phosphates," advantageously exhibit a particle size dispersion index I ranging from approximately 0.5 to 0.8.

The dispersion index I is determined by the formula:

$$I = \frac{\emptyset_{84} - \emptyset_{16}}{2\emptyset_{50}}$$

in which:

$\emptyset_{84}$ is the diameter of the particles, wherein 84% of the particles have a diameter smaller than $\emptyset_{84}$;

$\emptyset_{16}$ is the diameter of the particles, wherein of the particles have a diameter smaller than $\emptyset_{16}$; and $\emptyset_{50}$ is the mean particle diameter.

Thus, the LaCeTb phosphates of the invention exhibit a narrow particle size distribution, the crystallite agglomerates thereof having very small sizes.

These characteristics are of importance and are particularly desirable for the manufacture of phosphors.

The phosphates of the invention also exhibit the remarkable characteristic of a high lightness even after calcination at an elevated temperature in air.

This high lightness is characteristic of a low concentration of cerium(IV) and terium(IV) after calcination in air. In other words, the LaCeTb phosphates of the invention are characterized in that the elements cerium and terbium in the oxidation state 3+ are not oxidized to the 4+ state, even by a calcination in air.

The lightness characteristic is demonstrated by a colorimetric test which entails determining the characteristic coordinates of the color of the material in the CIE 1976 system ($L^*$, $a^*$, $b^*$) defined by the International Commission on Illumination, and listed in the Compendium of French Standards (AFNOR) colorimetric color no. X08-012 (1983). These coordinates are determined, for example, using a colorimeter marketed by the Pacific Scientific Company.

Thus, the LaCeTb phosphates of the invention exhibit, after calcination at 700° C. in air, a lightness, denoted by the $L^*$ coordinate, higher than 90 and advantageously ranging from 95 to 97.

This $L^*$ coordinate makes it possible to measure the whiteness of the product, which is directly related to the presence of colored species in the product, such as cerium and/or terbium in the 4+ oxidation state.

The products of the invention also exhibit color coordinates $a^*$ and $b^*$ respectively ranging from about −2 to −1 and from about 5 to 9.

Furthermore, when calcined at a temperature of 900° C. still in a nonreducing atmosphere, the products of the invention exhibit remarkable chromatic coordinates which are characteristic of an essentially pure white color: $L^*>99$, $-0.7<a^*<-0.1$ and $0.5<b^*<1.5$.

The presence or absence of cerium and/or terbium in the oxidation state of 4+ can also be assessed by a surface analysis of the products using the XPS technique described, in particular, in Praline et al, *Journal of Electron Spectroscopy and Related Phenomena,* 21, pp. 17 to 30 and 31 to 46 (1980).

Thus, in the energy range corresponding to the 3d electrons of cerium, the products of the invention exhibit two doublets characteristic of the 3+ oxidation state and the absence of a satellite peak, situated at 32.7 eV from the first peak, characteristic of an oxidation state of 4+.

The present invention also features a process for the production of cerium lanthanum terbium phosphates of the above formula (I), comprising formulating an aqueous suspension of a water-insoluble cerium lanthanum terbium oxalate or of a mixture of water-insoluble lanthanum, cerium and terbium oxalates, next mixing this aqueous suspension with a phosphate containing not more than one unneutralized acidic functional group, maintaining this mixture at a temperature above 70° C. and then separating off the precipitate thus formed and optionally drying such precipitate.

The product obtained after optional drying is heat-treated at a temperature above 600° C., advantageously ranging from 700° C. to 1,000° C. to effect conversion of the hexagonal crystalline phase into a pure monoclinic phase.

The product thus treated exhibits desirable luminescence at a wavelength of approximately 550 nm after exposure to a beam of wavelength of approximately 254 nm, namely, in the green region of the spectrum.

After mixing of the phosphate ions, the reaction mixture is advantageously maintained at a temperature ranging from 70° to 100° C.

It is also preferable to continuously stir the reaction mixture.

According to another characteristic of the invention, the reaction mixture is maintained for a period of time ranging from 15 minutes to 24 hours to complete the reaction.

The amount of phosphate ions mixed with the suspension is determined such as to provide a $PO_4^{\equiv}/RE$ (rare earth) ratio ranging from 1 to 5, preferably from 1.5 to 3.

Exemplary phosphates well suited for carrying out the process of the invention include the alkali or alkaline earth metal or ammonium phosphates containing not more than one unneutralized acidic functional group. The preferred compounds of the invention are diammonium phosphate and triammonium phosphate.

They are used either in solid form, or in the form of an aqueous solution thereof.

In the latter event, the phosphate concentration advantageously ranges, for example, from 50 g/l to 250 g/l.

The preferred insoluble rare earth compounds of the invention are lanthanum, cerium or terbium oxalates, or the mixed oxalates of two or three of these elements.

The aqueous suspension is prepared by adding rare earth oxalates to water in a total molar concentration of rare earths, expressed as the element, ranging from 0.1 mol/l to 1.0 mol/l and with a rare earth distribution corresponding to the stoichiometric proportions of the desired mixed phosphate having the formula (I).

Thus, the process of the invention makes it possible to employ a mixture which is concentrated in rare earths and therefore permits the production of the mixed rare earth phosphates on an industrial scale.

The order of addition or of mixing of the suspension with the phosphate compound is not critical. However, in a preferred embodiment of the invention, the phosphate compound is added to the suspension of insoluble rare earth compounds.

According to another characteristic of the invention, the pH of the reaction medium or mixture is advantageously maintained and controlled at a value ranging from 2 to 10, and preferably from 6 to 9.

The precipitate obtained is then separated off by any conventional means such as, for example, filtering, decanting, or centrifuging.

The process of this invention permits obtaining a precipitate which is easily separated by filtration.

The precipitate is advantageously dried, for example at a temperature ranging from 50° C. to 100° C., and then calcined as indicated above.

Such calcination may be carried out under any atmosphere whatever, for example under a neutral or oxidizing atmosphere, without risk of oxidation of the cerium and terbium species from the 3+ state to the 4+ state.

Thus, the calcination may be carried out in air, and this constitutes a considerable advantage in the event of a process for the production of the LaCeTb phosphates which were typically prepared by heat treatment under a reducing atmosphere.

According to the present invention, the subject LaCeTb phosphates may also include other elements serving, especially, as promoters of the luminescence properties thereof, or stabilizers of the oxidation numbers of the elements cerium and terbium.

These elements may be added, for example, at the point in time of the precipitation of the LaCeTb phosphate.

The luminescence properties of the calcined compounds or their texture-related characteristics (for example particle size, particle shape) may be improved further by a heat treatment with a "flux".

This heat treatment is conventionally employed in processes for the production of phosphors, especially for adapting the phosphor to its intended ultimate use.

Such LaCeTb phosphate-based phosphors are used, in particular, for the manufacture of low-pressure mercury lamps.

In order to further illustrate the present invention and the advantages thereof, the following specific examples are given, it being understood that same are intended only as illustrative and in nowise limitative.

EXAMPLE 1

A suspension of cerium lanthanum terbium oxalate was formulated, in water, containing 0.6 mol/l of rare earth elements, with the respective concentrations of each of the rare earths being as follows:

La=0.25 mol/l

Ce=0.27 mol/l

Tb=0.08 mol/l

To this suspension, heated to 100° C. was added an aqueous solution containing triammonium phosphate at a concentration of 1.8 mol/l.

The amount of solution was determined such as to provide a $PO_4^{\equiv}$/RE molar ratio of 3.

The pH of the reaction mixture was 7 at the end of addition of the triammonium phosphate solution. The mixture was maintained at 100° C. for 4 hours.

The LaCeTb phosphate obtained had the formula:

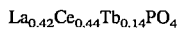

$$La_{0.42}Ce_{0.44}Tb_{0.14}PO_4$$

After filtration of the precipitate, washing with water and drying at 50° C. a white powder was obtained in a weight yield of 100% relative to the oxalate used.

X-ray diffraction analysis evidenced that the product had a hexagonal crystalline phase.

Particle size analysis of the dried product indicated a particle size distribution centered around a mean particle size of 1.8 μm with a dispersion index of 0.6.

These particles were agglomerates of needle-shaped elementary crystallites approximately 0.15 μm in length and approximately 0.01 μm in width, as evidenced by analysis using a transmission electron microscope and shown in FIG. 1.

Figure 2:
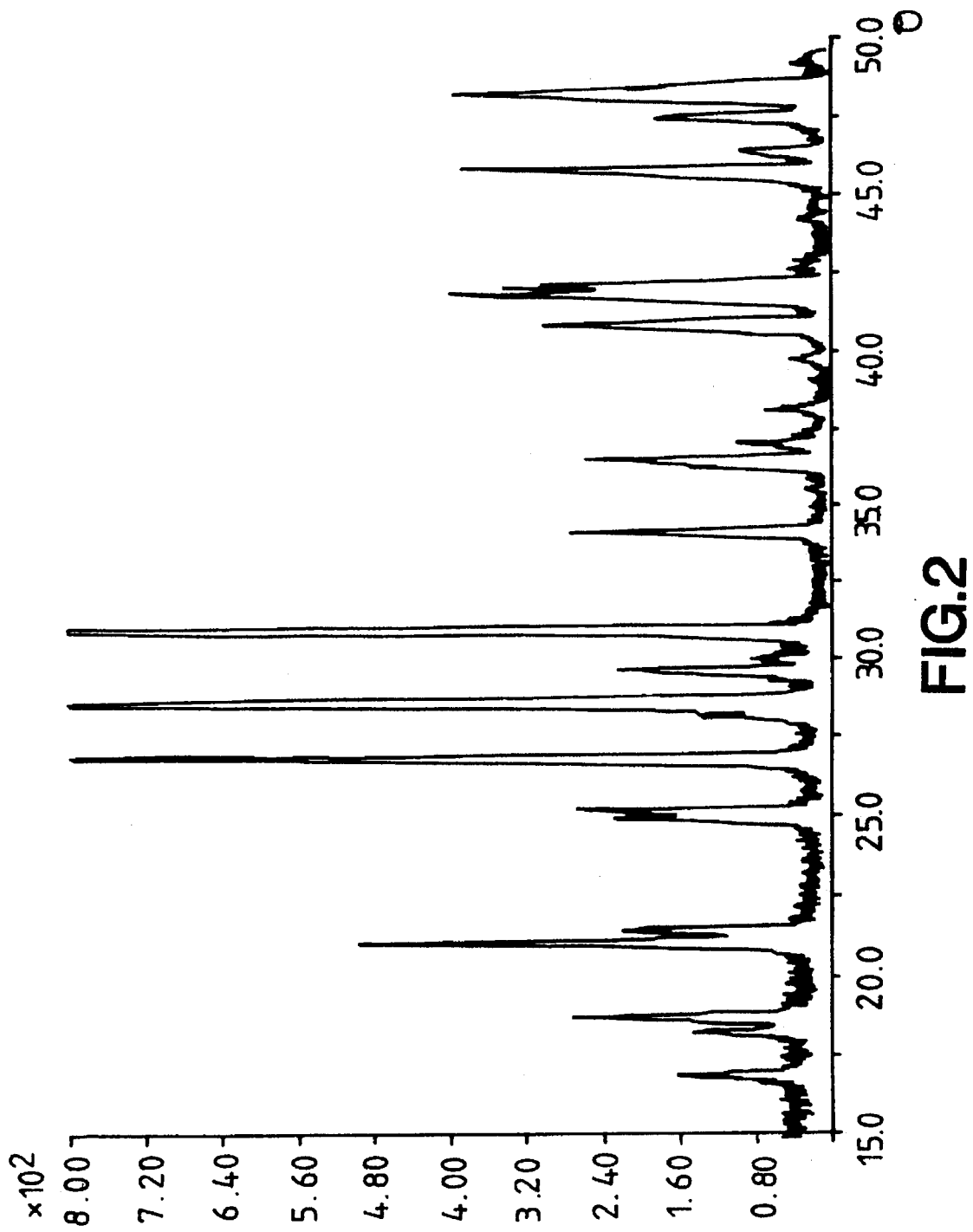
FIG. 2 is an X-ray diffraction pattern of the aggregates shown in FIG. 1, after calcination at 900° C.

This powder, calcined at 900° C. was a LaCeTb orthophosphate of well-crystallized monoclinic crystalline structure, as illustrated by the X-ray diffraction pattern of FIG. 2.

The particle size analysis of the calcined material evidenced that the mean particle diameter was 1.5 μm with a dispersion index of 0.9. These particles were agglomerates of submicron grains ranging from 0.1 to 0.4 μm in size.

EXAMPLE 2

The procedure of Example 1 was repeated, but the rare earth oxalate suspension contained 0.25 mol/l of rare earth elements, with the same ratio of the respective rare earths.

After filtration of the precipitate and washing with water, a white powder was obtained in a weight yield of 100% relative to the oxalate used.

After calcination at 900° C., the product obtained was a LaCeTb orthophosphate exhibiting the same crystalline structure as that of Example 1.

Particle size analysis of the product dried at 50° C. indicated a particle size distribution with a mean diameter of 2.5 μm with a dispersion index of 1.

The calcined material comprised agglomerates having a mean size on the same order of magnitude as that of the dried product, but these agglomerates were elementary grains ranging from 0.3 to 1 μm in size.

EXAMPLE 3

The procedure of Example 2 was repeated, except that the triammonium phosphate solution was added to provide a $PO^{3-}$/RE ratio of 2.

The product obtained, dried or calcined at 900° C., had the same crystalline structure and the same morphology as those corresponding to the dried or calcined product described in Example 2, respectively.

After calcination at 700° C. the chromatic coordinates of this material were: $L^*=95.7$, $a^*=1.66$ and $b^*=7.62$.

After calcination at 900° C., these coordinates were $L^*=99.6$, $a^*=-0.43$ and $b^*=1.3$.

EXAMPLE 4

An aqueous solution containing diammonium phosphate was added to the mixed oxalate suspension described in Example 1 and heated to 100° C. The $PO_4^{3-}$/RE ratio was 5 and the pH was adjusted to 5.

After aging for 12 hours this mixture was separated by filtration and washed with water. A white powder was then recovered in a weight yield of 100%, producing, after a heat treatment at 900° C. a LaCeTb orthophosphate of well-crystallized monoclinic structure.

EXAMPLE 5

A suspension, in water, of cerium lanthanum terbium oxalate at a concentration of 0.15 mol/l was added over 15 minutes to an aqueous solution of triammonium phosphate heated to 100° C.; the $PO_4^{3-}$/RE ratio was 3 and the pH was controlled at 7.

The mixture was aged for 2 hours.

After separation and washing of the solids, a white powder was recovered in a weight yield of 100%, producing, after a heat treatment at 900° C., a LaCeTb orthophosphate of well-crystallized monoclinic structure.

The particle size distribution of the phosphate, calcined at 900° C., was centered around 3 μm with a dispersion index of 0.9.

Measurement of Luminescence

The LaCeTb phosphates produced by the process of the invention were analyzed to determine their luminescence property.

The luminescence was determined using a Benthame spectrometer to produce an emission spectrum of a sample excited with a low-pressure mercury vapor lamp, with a wavelength of 254 nm. The calculation of the integral of the emission intensities between two wavelengths is designated the "Brightness".

These two wavelengths were 540 and 560 nm.

The results obtained after heat treatment of the LaCeTb phosphates of Examples 1 to 5 at a temperature of 900° C. for two hours are reported in the Table below:

TABLE

| Example | 1 | 2 | 3 | 4 | 5 |
| --- | --- | --- | --- | --- | --- |
| Brightness (ua) | 110 | 132 | 143 | 130 | 132 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Needle-shaped crystallites of a cerium lanthanum terbium phosphate having the formula (I):

$$La_xCe_yTb_{(1-x-y)}PO_4 \quad (I)$$

in which x and y are numbers, with x being in the range of 0.4 to 0.6 and x+y being greater than 0.8.

2. The LaCeTb phosphate crystallites as defined by claim 1, having lengths ranging from 50 nm to 200 nm and widths ranging from 10 nm to 50 nm.

3. The LaCeTb phosphate crystallites as defined by claim 1, having an essentially pure monoclinic crystalline structure.

4. A particulate LaCeTb phosphate comprising aggregates of the needle-shaped crystallites as defined by claim 1.

5. The particulate LaCeTb phosphate as defined by claim 4, said aggregates having a mean diameter ranging from 1 µm to 15 µm.

6. The particulate LaCeTb phosphate as defined by claim 5, said aggregates having a mean diameter ranging from 2 µm to 10 µm.

7. The particulate LaCeTb phosphate as defined by claim 4, having a particle size dispersion index I ranging from about 0.5 to about 0.8.

8. The particulate LaCeTb phosphate as defined by claim 4, exhibiting a lightness, represented by the $L^*$ coordinate thereof, of greater than 90.

9. The particulate LaCeTb phosphate as defined by claim 4, exhibiting a lightness, represented by the $L^*$ coordinate thereof, ranging from 95 to 97.

10. The particulate LaCeTb phosphate as defined by claim 4, exhibiting a lightness, represented by the $L^*$ coordinate thereof, of greater than 99.

11. The particulate LaCeTb phosphate as defined by claim 4, exhibiting a color coordinate $a^*$ ranging from about −2 to about −1 and a color coordinate $b^*$ ranging from about 5 to about 9.

12. The particulate LaCeTb phosphate as defined by claim 10, exhibiting a color coordinate $a^*$ ranging from −0.7 to −0.1 and a color coordinate $b^*$ ranging from 0.5 to 1.5.

13. The particulate LaCeTb phosphate as defined by claim 4, after calcination of the phosphate at a temperature of at least 700° C.

14. The particulate LaCeTb phosphate as defined by claim 4, after calcination of the phosphate at a temperature of at least 900° C.

15. The particulate LaCeTb phosphate as defined by claim 4, which exhibits luminescence at a wavelength of about 550 nm upon exposure to a light beam of approximately 254 nm.

16. The particulate LaCeTb phosphate as defined by claim 4, having an essentially pure monoclinic crystalline structure.

17. The LaCeTb phosphate crystallites as defined by claim 1, further comprising a luminescence promoter or oxidation state stabilizer.

18. A phosphor from the phosphate of claim 1.

19. The particulate LaCeTb phosphate as defined by claim 4, wherein after calcination in air, the phosphate exhibits two doublets and the absence of a satellite peak situated at 32.7 eV from the first peak in XPS analysis in the energy range corresponding to the 3d electron of cerium.

20. A phosphor obtained by calcination of the phosphate of claim 4 at a temperature of at least 600° C.

* * * * *